UNITED STATES PATENT OFFICE.

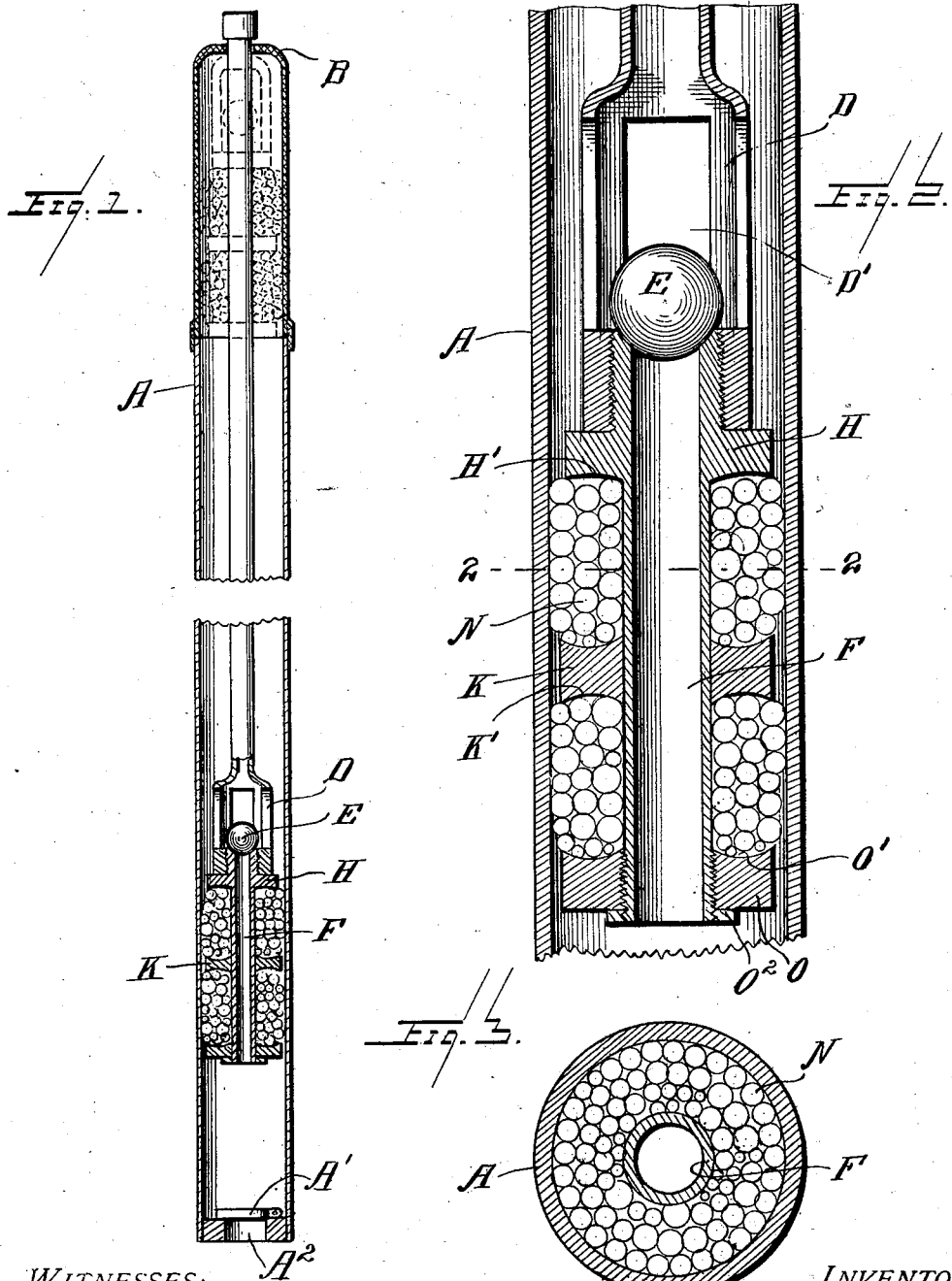

FORTES M. KLECKNER, OF CANEY, KANSAS.

PACKING FOR PUMPS FOR OIL-WELLS, &c.

No. 861,127.          Specification of Letters Patent.          Patented July 23, 1907.

Application filed September 7, 1906. Serial No. 333,711.

*To all whom it may concern:*

Be it known that I, FORTES M. KLECKNER, a citizen of the United States, residing at Caney, in the county of Montgomery and State of Kansas, have invented certain new and useful Improvements in Packing for Pumps for Oil-Wells, &c.; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in packing for oil and other pumps, and comprises a series of flexible balls which are adapted to be inserted within the cylinder and about the reciprocating piston rod and adapted to be compressed against one another by the tightening of a nut upon the threaded piston, thereby causing the balls to bear yieldingly against the inner surface of the cylinder.

The invention comprises various details of construction and arrangements of parts which will be hereinafter fully described and then specifically defined in the appended claims.

I illustrate my invention in the accompanying drawings, in which:—

Figure 1 is a vertical sectional view through my invention, and Fig. 2 is a cross sectional view.

Reference now being had to the details of the drawings by letter, A designates a cylinder or barrel adapted especially for use in raising oil from an oil well or the same may be used in connection with pumps of various kinds, and has a valve A' in the bottom thereof inclosing the inlet opening $A^2$.

E is a ball valve having a seat on the upper end of the hollow piston stem F which has threaded connection with the lower end of the shell D having openings D' therein, through which the liquid is allowed to pass. Projecting from said hollow piston stem is the shoulder H, and K is a washer having the opposite faces thereof concaved and adapted to fit over the hollow piston stem F, and O is a nut fitted to the threaded end of the latter, a jam nut $O^2$ being fitted out beyond the nut O to hold the latter in place.

Flexible rubber balls N are interposed between said washer and the shoulder H and also between the nut O, and as the nut $O^2$ is tightened, said balls may be compressed and made to tightly engage frictionally the inner surface of the shell or barrel, making an efficient packing therefor.

B is a shell which is adapted to normally rest upon the upper end of the barrel and preferably of the same diameter as the latter, and is provided with an opening at its upper end through which the rod connected to the piston stem is adapted to pass freely. Said shell B is merely a pipe fitted over the top of the barrel to hold the balls in place until they are put within the working barrel. As the shell or cap D rises, the curved shoulder at the upper portion thereof coming in contact with the upper closed end of the shell G, will cause the latter to rise. When the piston is lowered again in the barrel, the lower end of the shell B will contact with the upper end of the barrel, with the openings in the two registering, thereby allowing the piston to be readily pushed down into its working position.

By the provision of a packing embodying the features of my invention, it will be noted that a simple and efficient device is afforded whereby the life of the packing of pumps may be prolonged as the balls are constantly changing position and the wear is not confined to any particular part of the packing, the balls being easily replaced when desired.

While I have shown my invention as being applied especially to the cylindrical barrel of an oil pump, it will be understood that it may be applied to pumps of all kinds in which a packing is desired intermediate the piston and the surrounding cylinder.

What I claim is:—

1. A packing for pumps comprising a series of flexible balls adapted to be compressed against one another and against the inner surface of a pump cylinder, as set forth.

2. A packing for pumps comprising, in combination with a cylinder, a valve casing and piston stem secured thereto, a series of flexible balls positioned about the piston stem, and means for compressing the same against one another and against the inner surface of the cylinder, as set forth.

3. In combination with the cylinder of a pump, a valve casing and stem secured thereto, a series of flexible balls mounted within the cylinder and around the piston stem, and a nut fitted upon a threaded portion of the piston stem and adapted to compress the balls against one another and against the inner surface of the cylinder, as set forth.

4. In combination with a cylinder for pumps, a valve casing, a piston stem secured to said casing, a shoulder upon said stem, a washer mounted upon the latter, a nut fitted upon a threaded portion of the stem, and series of flexible balls interposed between the shoulder and said washer and between the latter and said nut, as set forth.

5. In combination with a cylinder for pumps, a valve casing, a piston stem secured to said casing, a shoulder upon said stem, a washer mounted upon the latter, a nut fitted upon a threaded portion of the stem, the opposite faces of said washer having annular grooves, one face of said shoulder also having an annular groove, and series of balls interposed between said nut and washer and between the latter and said shoulder, as set forth.

In testimony whereof I hereunto affix my signature in the presence of two witnesses.

FORTES M. KLECKNER.

Witnesses:
     R. W. BATES,
     JERE BAKER.